United States Patent [19]
Ritter et al.

[11] 3,725,632
[45] Apr. 3, 1973

[54] MULTIPLE SPOT WELDING MACHINES

[75] Inventors: Josef Ritter; Hans Gott, both of Graz, Austria

[73] Assignee: EVG Entwicklungs-und Verwertungsgesellschaft m.b.H., Graz (Steiermark), Austria

[22] Filed: Mar. 16, 1971

[21] Appl. No.: 124,865

[30] Foreign Application Priority Data

Mar. 25, 1970 Austria..................................2800/70

[52] U.S. Cl. .......................219/116, 219/56, 219/87
[51] Int. Cl. ...............................................B23k 9/10
[58] Field of Search ......219/56, 87, 88, 116; 323/44, 323/48, 49

[56] References Cited
UNITED STATES PATENTS

| | | |
|---|---|---|
| 2,229,993 | 1/1941 | Weightman..........................219/87 |
| 3,424,888 | 1/1969 | Sommeregger et al.............219/88 X |
| 1,143,220 | 6/1915 | Mack ....................................219/87 |

*Primary Examiner*— C. L. Albritton
*Attorney*—Ernest F. Marmorek

[57] ABSTRACT

A multiple spot welding machine suitable for the manufacture of welded wire mesh for concrete reinforcement has two pairs of bus bars supported on a transverse wall extending upwardly from a base plate of the machine. Two rows of transformers, for feeding the two pairs of bus bars, are arranged one on each side of the transverse wall. A number of electrodes are shiftable along the bus bars to any one of which each electrode is connectable. A vertically movable spring loaded bridging electrode is provided above the electrodes on the bus bars.

6 Claims, 4 Drawing Figures

INVENTORS:
Josef Ritter and Hans Gött,

MULTIPLE SPOT WELDING MACHINES

The invention relates to a multiple spot welding machine, with a system of transverse bus bars fed with electric power by transformers, and with at least one row of electrodes which can be shifted in position along the bus bars. In multiple spot welding machines of this kind each row of welding electrodes is served by two or more pairs of bus bars, each individual electrode being arranged so that it can be connected selectively to any one of the bus bars.

In large machines constructed in this way difficulties arise in supporting the total "welding pressure", which is the total downward thrust applied by all the sliding electrodes to the bus bar system during operation of the machine. The supporting structure tends to be excessively massive and bulky, leaving insufficient room for conveniently accommodating the welding transformers, in particular so as to obtain short conductor leads between the transformers and the bus bars. These difficulties become particularly severe if the machine is equipped with several pairs of bus bars, to allow adjustment of the machine to different operating conditions. The constructional difficulties are also increased if the bus bar system is subdivided into three sections, each receiving power over a transformer from only one phase of a three-phase power supply, in order to obtain a more even loading of the three-phase supply. Both these methods require an increase in the number of welding transformers, making it more difficult to accommodate the transformers close to the bus bar system.

In accordance with the present invention, a multiple spot welding machine has a system of transverse bus bars supported on a transverse wall extending upwards from a base plate of the machine, two or more electrodes which can be shifted in position along the bus bars and two rows of transformers for feeding the bus bar system, one row on each side of the transverse row.

With this arrangement the welding pressure applied by the electrodes is taken by the transverse wall which can easily be stiffened sufficiently to prevent it from bending and which takes up almost no room, measured in the longitudinal direction of the machine. A large number of welding transformers can be accommodated on either side of the wall, each transformer being positioned close to the bus bar system, which runs along transversely supported by the wall.

Preferably the bus bar system, which extends along the transverse wall, is subdivided into three independent sections fed by three transformers, each of which receives a single phase from a three-phase power supply.

To make the welding machine more adaptable to suit different operating conditions, the bus bar system may consist of two pairs of bus bars, the transformers for the one bus bar pair being positioned on one side of the transverse wall and the transformers for the other bus bar pair being on the other side of the transverse wall. This gives the shortest possible conductor leads. The machine can be given still further adaptability if each section of each bus bar pair is fed by two transformers connected, either in series or in parallel with each other, to the same phase of a three-phase current source.

Gaps between the ends of the bus bar sections are preferably staggered along the transverse wall so that they do not come opposite each other, that is to say so that at any given cross section through the bus bar system not more than one gap is intersected. This allows an electrode connection to be provided at any desired position along the length of the pair of bus bars.

An example of a wire mesh welding machine according to the invention will now be described with reference to the accompanying drawings, in which.

Figure 1:
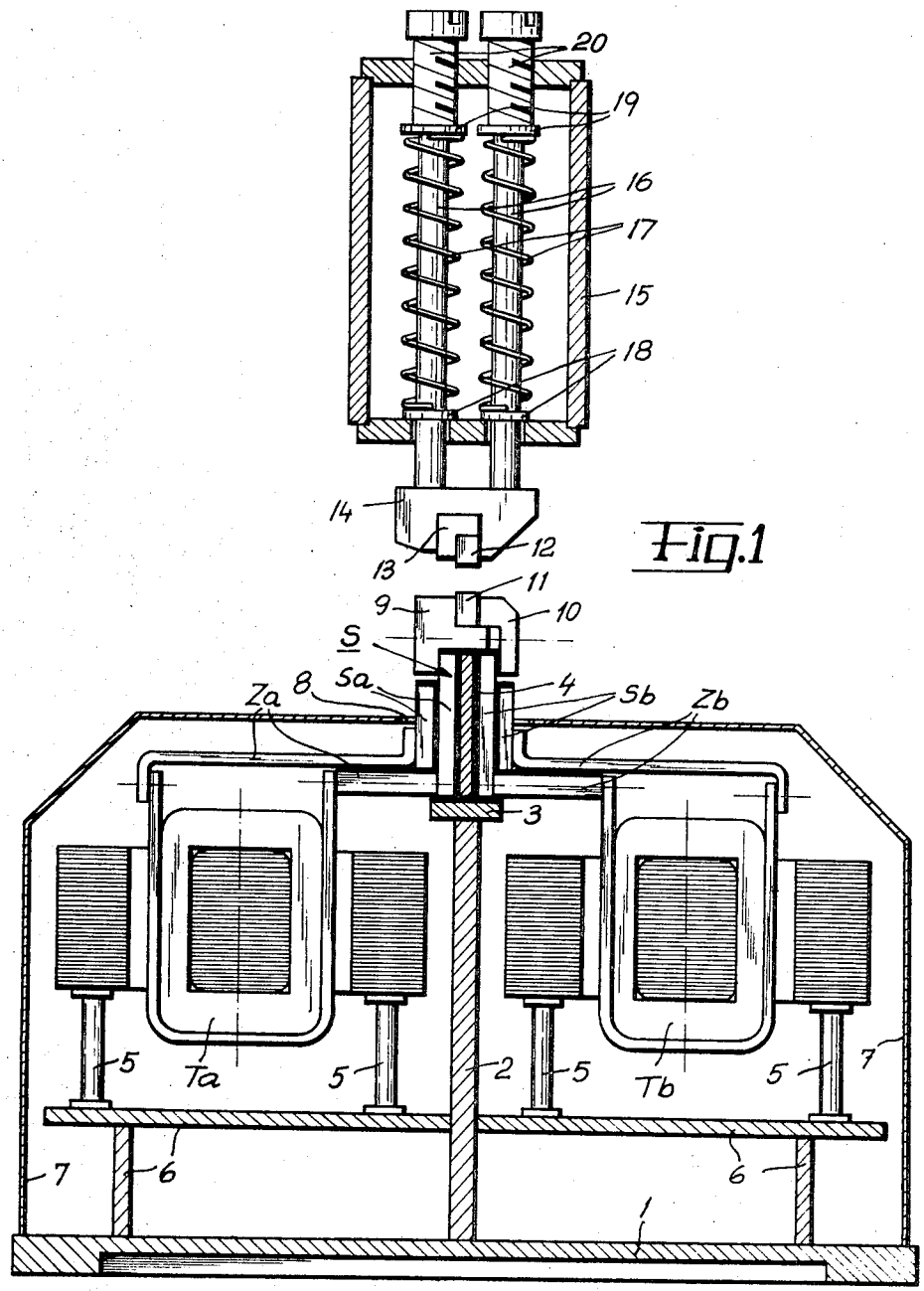
FIG. 1 is a partly sectioned diagrammatical side view of the machine.

A base plate 1 supports a vertical transverse wall 2, which extends right across the machine. At its top end the wall 2 supports a transverse beam 3, which in turn supports an upper vertical transverse beam 4. Mounted at each side of the upper transverse beam 4, insulated as indicated by heavy lines, are two pairs of bus bars, the pair Sa on the one side and the pair Sb on the other side. This system, consisting of the upper transverse beam 4 and the two pairs of bus bars is indicated in FIG. 1 by the symbol S. Of the two pairs of bus bars, the pair Sa is connected over leads Za to a welding transformer Ta, the pair of bus bars Sb being connected over leads Zb to a second transformer Tb. Each transformer is supported on feet 5 on a common supporting framework 6, itself supported by the base-plate 1 of the machine. All the transformers of the welding machine are enclosed in a common housing 7 which has a slot 8, through which the bus bar system S projects upwards.

The machine has a number of sliding electrodes, which can be shifted independently, transversely along the bus bar system S. Each sliding electrode 11 is removably clamped between two clamping jaws 9, 10. The upper part of the machine is equipped with a bridging electrode 12, which is retained in a holder 14 by means of a retaining piece 13. The holder 14 is mounted on two vertical sliding rods 16, capable of sliding up and down in a hollow electrode support beam 15. The upper ends of the sliding rods 16 slide up and down in guide bushes 20, screwed adjustably into the upper part of the electrode beam 15. The upward sliding movement of the electrode holder 14 is opposed by two helical springs 17 mounted over the two sliding rods 16, the compression springs 17 being supported at their lower ends by collars 18 fixed to the sliding rods 16, and at their upper ends by flanges 19 of the guide bushes 20. When the machine is in operation the two helical compression springs 17 thrust the upper, bridging electrode 12 downwards against the upper surface of the workpiece, that is to say the material of the mesh is squeezed between the upper electrode 12 and the lower electrode 11, the springs 17 applying, adjustably, what is known as the "welding pressure".

From FIG. 1 it will be seen that the total welding pressure, which is the sum of all the welding pressure applied to the lower electrodes 11 is transmitted downwards through the electrode holder 9, 10, the upper transverse wall 4, the transverse beam 3 and the vertical transverse wall 2 to the base plate 1. The vertical transverse wall 2 is prevented from bending by stiffening ribs which are not shown in the drawing. It should be pointed out that this way of arranging the transformers, in two rows on either side of the welding electrodes, provides the great advantage that twice as many transformers can be installed in a machine of a given width, without this involving any increase in the lengths of the conductor leads between the transformers and the bus bar system S.

Figure 2:
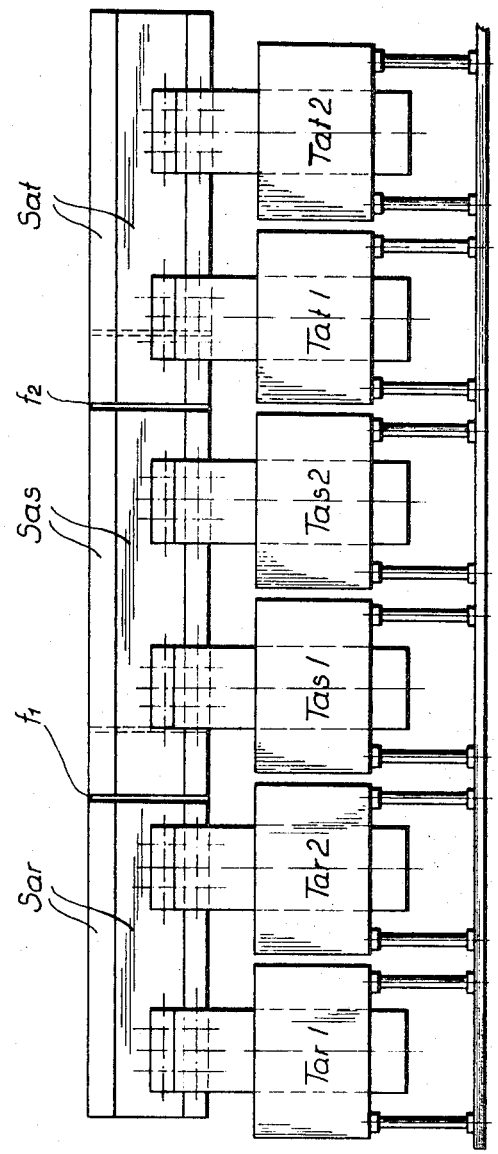
FIG. 2 is a diagrammatical front view of a lower part of the machine, seen looking in the direction of advance of the mesh.
Figure 3:
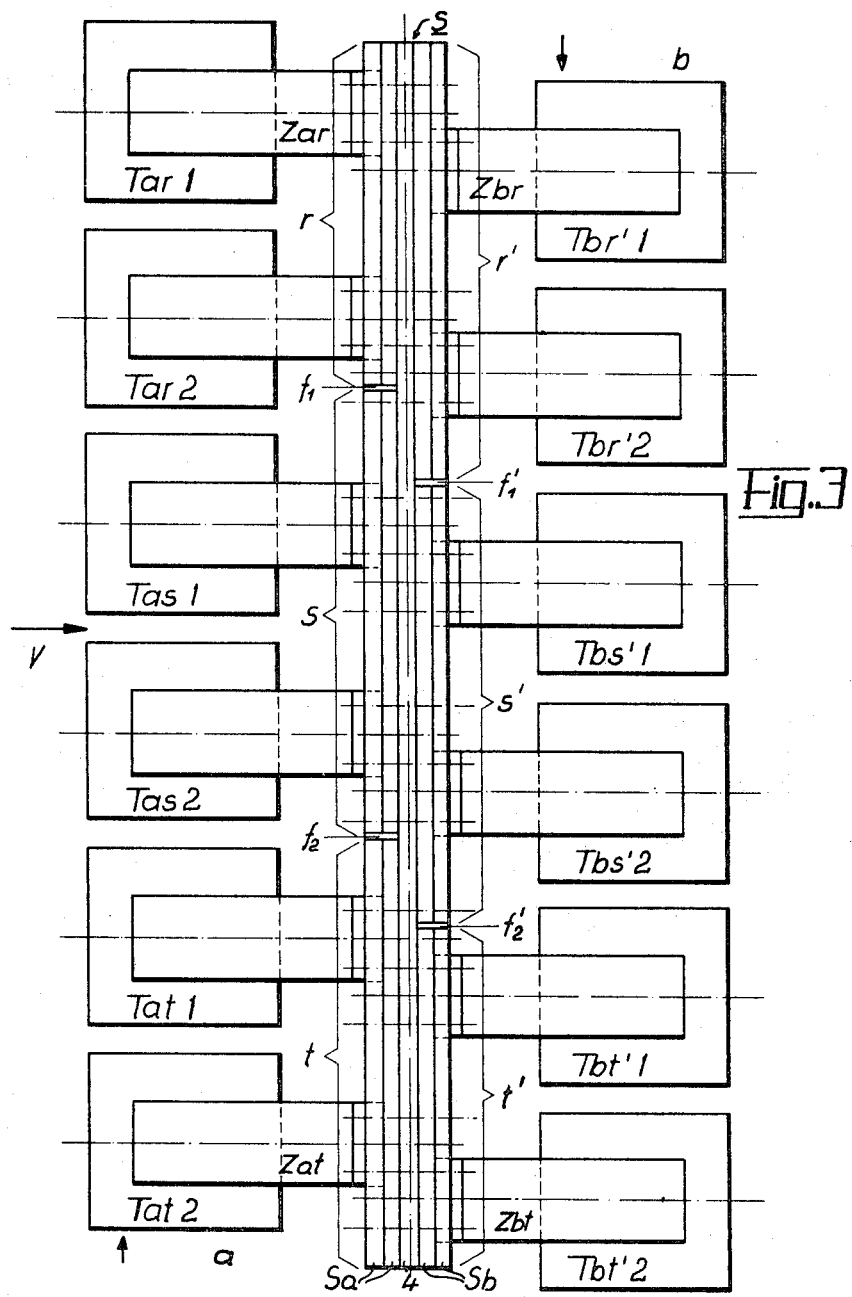
FIG. 3 is a corresponding plan view of the lower part of the machine.

With reference to the plan view of the lower part of the machine shown in FIG. 3, together with the front view shown in FIG. 2, seen in the direction of the arrow V in FIG. 3, that is to say seen in the direction of advance of the wire mesh workpiece, it will be observed that each pair of bus bars S$a$ and S$b$ is divided into three independent and separate sections. Thus, as shown in FIG. 3, the bus bar pair S$a$ is divided into the three independent sections $r$, $s$ and $t$, the bus bar pair S$b$ being divided into three independent sections $r'$, $s'$, and $t'$. The bus bar sections $r$, $s$ and $t$ are separated by gaps $f1$ and $f2$, the bus bar sections $r'$, $s'$ and $t'$ being separated by gaps $f1'$ and $f2'$. It will be observed in FIG. 3 that the gaps are staggered in position, so that the gap $f1$ does not come opposite the gap $f1'$ and the gap $f2$ does not come opposite the gap $f2'$. Consequently if a cross section is taken anywhere along the bus bar system S, this cannot intersect more than one of the gaps. This allows full electric contact to be obtained anywhere along the bus bar system.

In FIGS. 2 and 3 the individual transformers are represented by the letter T followed by a system of suffixes. The first suffix is the letter $a$ or the letter $b$, indicating that the particular transformer feeds the bus bar pair S$a$ or S$b$. The second suffix indicates which section of the bus bar pair is fed, that is to say the section $r$ or $s$ or $t$, or on the right in FIG. 3 the section $r'$, or $s'$, or $t'$. Finally in the present example each section is fed by two transformers, for example the section r is fed by the two transformers T$ar$1 and T$ar$2, whereas the section s is fed by the two transformers T$as$1 and T$as$2, and so on.

Figure 4:
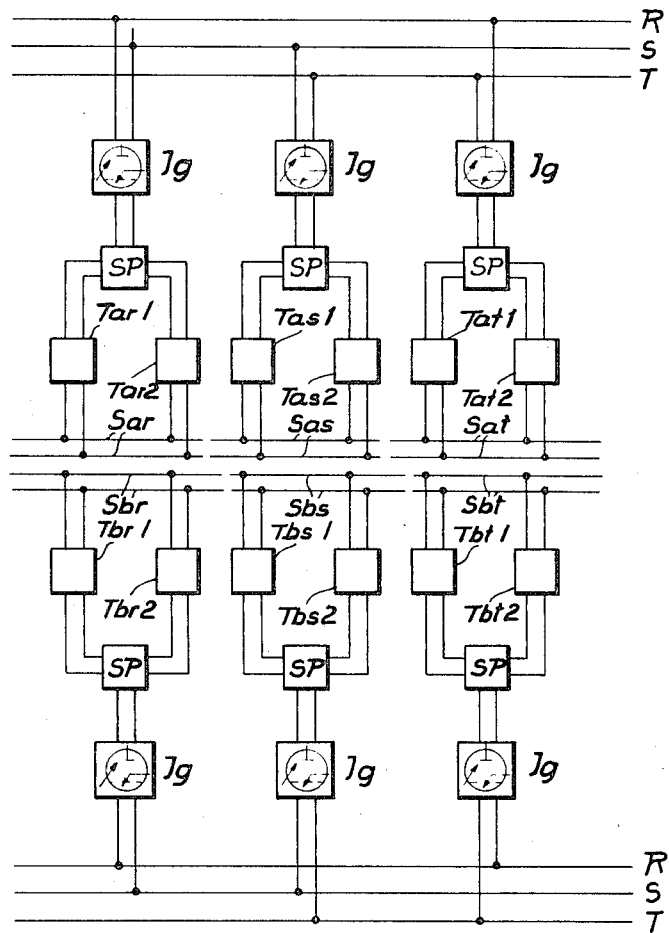
FIG. 4 is an example of an electric circuit for energizing the transformers.

FIG. 4 represents diagrammatically an electric circuit for feeding the transformers. Each pair of transformers, for feeding the pair of bus bars of a particular bus bar section is fed with electric power over a series-parallel switch SP, which connects the two transformers together.

Each series-parallel switch SP is itself fed with power, from a three-phase supply source, over an ignitron Jg which acts as a contactless switch. The arrangement allows the two transformers for each bus bar section to be connected together either in series or in parallel.

The circuit shown in FIG. 4 allows power to be fed to the system in any one of three alternative ways, to suit the particular welding job in hand. The three alternative operating methods are as follows:

1. By this method power is fed only to the three bus bar sections on the left in FIG. 3, that is to say to the S$a$ bus bar sections S$ar$, S$as$ and S$at$, the transformers being connected together in series. That is to say the series-parallel switches SP are operated in such a way that the two transformers T$ar$1 and T$ar$2 are connected together in series, the transformers T$as$1 and T$as$2 are connected together in series, and the transformers T$at$1 and T$at$2 are connected together in series. This method of operation consumes the least power.

2. By this method of operating, only the three sections of the bus bar system S$a$ are fed with power, but in this case the pairs of transformers are connected together in parallel, that is to say the switches SP are operated in such a way that transformers T$ar$1 and T$ar$2 are in parallel, T$as$1 and T$as$2 are in parallel, and T$at$1 and T$at$2 are also connected in parallel with each other. The power consumption is twice as high as it is by method 1.

3. By this method all three sections of both bus bar systems S$a$ and S$b$ are fed with power, the pairs of transformers being connected together in parallel, by suitable operation of the series-parallel switches SP. The power consumption is four times greater than with method 1.

The alternatives provided by this method, comprising in the first place two or more transformers for each bus bar section and, in the second place, a series-parallel switch which allows the two transformers of each pair to be connected together either in series or in parallel, provides the great advantage that for each particular welding job the transformers operate with the highest power factor, that is to say with the least reactive power consumption. Consequently using a single mesh welding machine it is possible to weld with high efficiency mesh of a wide variety of wire diameters.

For welding mesh of the kind which has several different wire diameters, at different locations, the following method can be adopted. Of the bus bar pair S$a$ three sections can have their transformer pairs connected together in parallel that is to say T$ar$1, T$ar$2 are in parallel, T$as$1, T$as$2 are in parallel and T$at$1, T$at$2 are in parallel, whereas for the three sections of the bus bar pair S$b$ the transformer pairs are in series. The sliding electrodes are connected to the two bus bar pairs in such a way that the large diameter wires are welded over the bus bar pair S$a$ whereas the small diameter wires are welded over the bus bar pair S$b$. Here again the machine operates at a high power factor.

Each pair of transformers may comprise two similar windings on a common core, for example the pair of transformers T$ar$1, T$ar$2 may be constructed by mounting two similar windings on a common core. This gives a particularly compact transformer construction.

The transformers for the two bus bar pairs S$a$ and S$b$ are preferably connected to different mains transformers, that is to say the T$a$ transformers and the T$b$ transformers are connected to different mains transformers. This arrangement gives a still better power factor.

We claim:

1. A multiple spot welding machine comprising a base plate, central transverse wall means extending upwardly from said base plate, a system of transverse bus bars supported on said transverse wall means under and close to a line of welding, and two rows of transformers for feeding said bus bar system and disposed one on either side of said transverse wall means.

2. A welding machine according to claim 1, wherein said bus bar system comprises two pairs of bus bars arranged closely side by side, one of said rows of said transformers feeding one of said bus bar pairs and the other of said rows of said transformers feeding the other of said bus bar pairs.

3. A multiple spot welding machine comprising a base plate, transverse wall means extending upwardly from said base plate, a system of transverse bus bars supported on said transverse wall means, and two rows or transformers for feeding said bus bar system and disposed one on either side of said transverse wall means, said bus bar system including three independent sections fed by three transformers each of which is adapted to receive a single phase from a three-phase power supply, each of said bus bar sections being fed by two transformers and means provided for connecting said two transformers as a pair alternatively in series or in parallel with each other to the same phase of said three-phase power supply.

4. A welding machine according to claim 3, wherein each of said two transformers feeding each bus bar pair comprises one primary and two secondary windings on a common core.

5. A welding machine according to claim 1 wherein gaps are formed between ends of adjacent bus bar sections and said gaps are staggered in position along said transverse wall, whereby at any given cross-section through said bus bar system not more than one gap can be intersected.

6. A welding machine according to claim 1 further including two mains transformers, one mains transformer feeding one row of transformers for feeding said bus bar system and said other of said mains transformers feeding said other row of transformers for feeding the bus bar system.

* * * * *